United States Patent
Hicks

(10) Patent No.: US 11,174,960 B2
(45) Date of Patent: Nov. 16, 2021

(54) MOTORIZED BALL VALVE WITH ACTUATOR LOCK

(71) Applicant: Michael Reece Hicks, Edmond, OK (US)

(72) Inventor: Michael Reece Hicks, Edmond, OK (US)

(73) Assignee: Emkade Distribution, Inc., Oklahoma City, OK (US)

( * ) Notice: Subject to any disclaimer, the term of this patent is extended or adjusted under 35 U.S.C. 154(b) by 0 days.

(21) Appl. No.: 16/458,031

(22) Filed: Jun. 29, 2019

(65) Prior Publication Data

US 2020/0003322 A1 Jan. 2, 2020

Related U.S. Application Data

(60) Provisional application No. 62/692,529, filed on Jun. 29, 2018.

(51) Int. Cl.
  *F16K 31/04* (2006.01)
  *F16K 5/06* (2006.01)
  *F16K 31/05* (2006.01)

(52) U.S. Cl.
  CPC .......... *F16K 31/041* (2013.01); *F16K 5/0647* (2013.01); *F16K 31/043* (2013.01); *F16K 31/055* (2013.01); *Y10T 137/0508* (2015.04); *Y10T 137/6035* (2015.04); *Y10T 137/6089* (2015.04)

(58) Field of Classification Search
  CPC .... F16K 31/041; F16K 31/043; F16K 31/055; F16K 5/0647; Y10T 137/6089; Y10T 137/0508; Y10T 137/6035

USPC .................. 251/129.11–13, 315.13, 315.14; 137/315.18, 315.35
See application file for complete search history.

(56) References Cited

U.S. PATENT DOCUMENTS

| | | | | |
|---|---|---|---|---|
| 2,890,017 | A | * 6/1959 | Shafer | F16K 27/107 251/174 |
| 4,193,420 | A | * 3/1980 | Hewson | F16K 11/22 137/356 |
| 5,323,805 | A | * 6/1994 | Scaramucci | F16K 35/06 137/382 |
| 5,540,414 | A | 7/1996 | Giordani et al. | |
| 5,808,534 | A | * 9/1998 | Laffey | H01F 7/081 335/250 |
| 6,003,837 | A | 12/1999 | Raymond, Jr. et al. | |

(Continued)

FOREIGN PATENT DOCUMENTS

WO 2017020093 A1 2/2017

OTHER PUBLICATIONS

International Search Report and Written Opinion issued in connection with corresponding PCT Application No. PCT/US2019/40028 dated Sep. 20, 2019.

*Primary Examiner* — Matthew W Jellett
(74) *Attorney, Agent, or Firm* — Crowe & Dunlevy, P.C.

(57) ABSTRACT

A motorized ball valve has valve body with an actuator bracket receiver. The actuator bracket receiver has a pair of rails. The ball valve also includes a valve stem extending through the actuator bracket receiver and an actuator operably connected to the valve stem. A mounting bracket is connected between the actuator and the valve body to support the actuator. The mounting bracket is captured between the pair of rails of the actuator bracket receiver to offset torsional forces generated by the actuator.

12 Claims, 5 Drawing Sheets

(56) References Cited

U.S. PATENT DOCUMENTS

| | | |
|---|---|---|
| 6,186,471 B1 | 2/2001 | Genga et al. |
| 6,880,806 B2 | 4/2005 | Haikawa et al. |
| 8,210,499 B2 | 7/2012 | Madden et al. |
| 2007/0007483 A1 | 1/2007 | Leblanc et al. |
| 2012/0132838 A1 | 5/2012 | Staffiere et al. |
| 2013/0134334 A1 | 5/2013 | Denat et al. |
| 2016/0053913 A1 | 2/2016 | Chen |
| 2016/0102775 A1 | 4/2016 | Shakkour |
| 2016/0319950 A1 | 11/2016 | Geffert et al. |

\* cited by examiner

MOTORIZED BALL VALVE WITH ACTUATOR LOCK

RELATED APPLICATIONS

This application claims the benefit of U.S. Provisional Patent Application Ser. No. 62/692,529 filed Jun. 29, 2018 and entitled, "Motorized Ball Valve with Actuator Lock," the disclosure of which is herein incorporated by reference.

FIELD OF THE INVENTION

This invention relates generally to motorized ball valves, and more particularly, but not by way of limitation, to a motorized ball valve with an improved actuator bracket.

BACKGROUND

For many years, ball valves have been used in control applications in a large variety of industrial applications. Generally, a ball valve includes a valve body and a rotatable valve ball. The valve ball includes a central port that permits fluid flow through the valve body when the valve ball is rotated into an open position. When the valve ball is rotated into a closed position, the central port is no longer aligned with the inlet and outlet of the valve body and flow is blocked. Most ball valves are intended for bidirectional fluid flow, such that the inlet and outlet of the valve body may be interchangeable. The rotational position of the valve ball is typically manipulated with a valve stem that is either manually adjusted with a handle or automatically adjusted with an actuator.

In the past, valve actuator motors have been connected to the top of the valve body with an intermediate bracket. As indicated in the PRIOR ART drawing in FIG. 1, a motorized ball valve 200 includes a valve body 202 and a valve stem 204 that extends from the top of the valve body 202. A motorized actuator 206 is connected to the valve body 202 with a mount 208. The mount 208 is typically constructed from a piece of rectangular tubing that includes an open central passage that allows the mount 208 to be bolted to both the valve body 202 and the actuator 206 with fasteners 210.

Although widely adopted, the conventional actuator mount 208 may present reliability concerns after extended use. The repetitive torque applied by the actuator 206 tends to weaken the connection through the mount 208. This results in rotation of the mount 208 relative to the valve body 202. As axial rotation increases between the joining parts, this slop or play developed between the valve body 202, actuator 206 and mount 208, alters the relative motion of the valve ball from its original set point within the valve body 202. This may lead to leakage, inefficient flow, and damage to the internal components within the valve body 202. As the valve ages, service conditions tend to increase the required torque for proper operation. The relative axial motion of the mount, slipping against the joining fasteners, transfers torsional loads to these components into shear load which leads to additional deformation and consequently more adverse axial movement, potentially leading to failure of the joining connection. There is, therefore, a need for an improved motorized ball valve that provides for a more secure connection between the valve body 202 and the actuator 204. It is to these and other objectives that the present invention is directed.

SUMMARY OF THE INVENTION

A motorized ball valve has valve body with an actuator bracket receiver. The actuator bracket receiver has a pair of rails. The ball valve also includes a valve stem extending through the actuator bracket receiver and an actuator operably connected to the valve stem. A mounting bracket is connected between the actuator and the valve body to support the actuator. The mounting bracket is captured between the pair of rails of the actuator bracket receiver to offset torsional forces generated by the actuator.

WRITTEN DESCRIPTION

Figure 1:
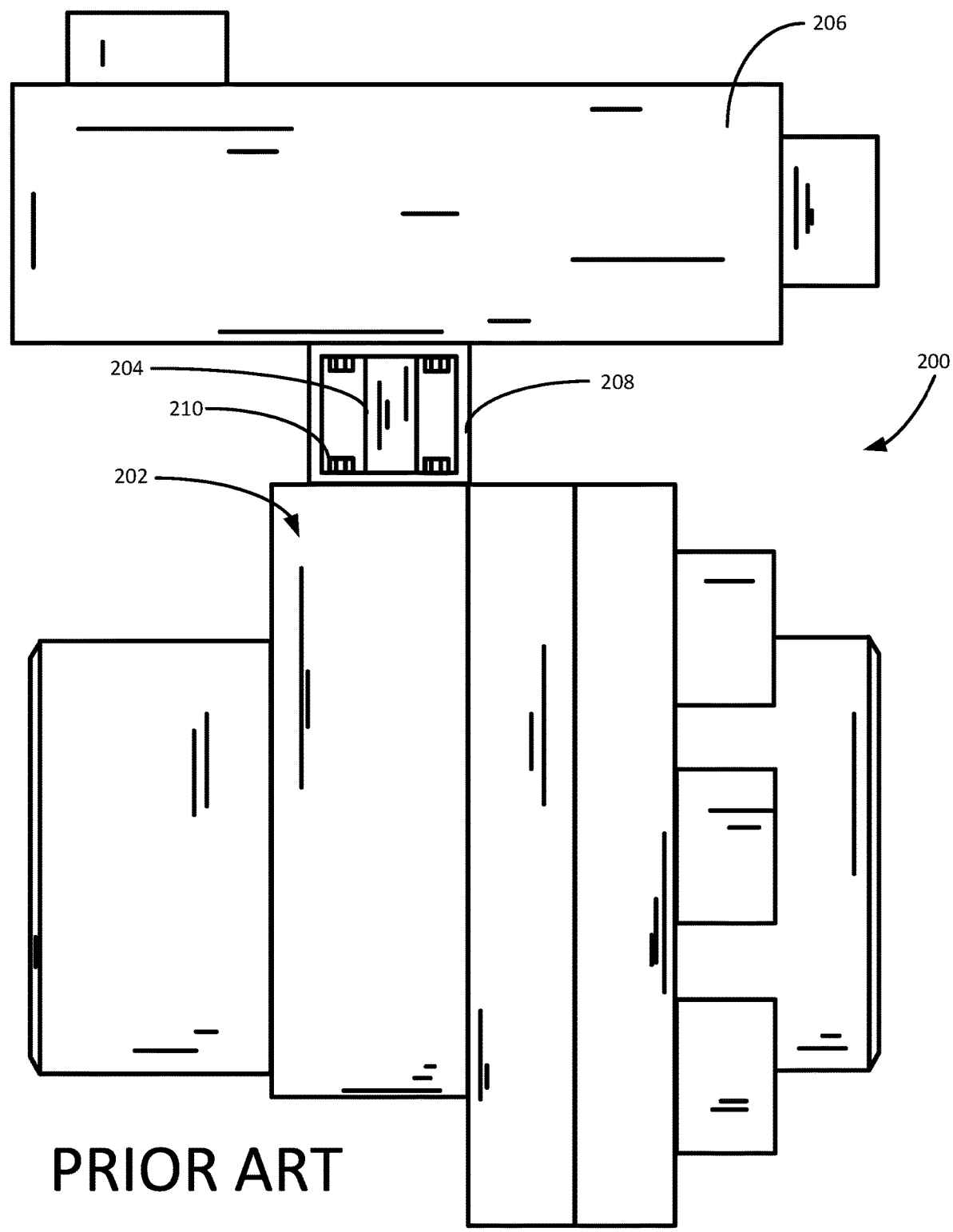
FIG. 1 is a side view of a prior art motorized ball valve.
Figure 2:
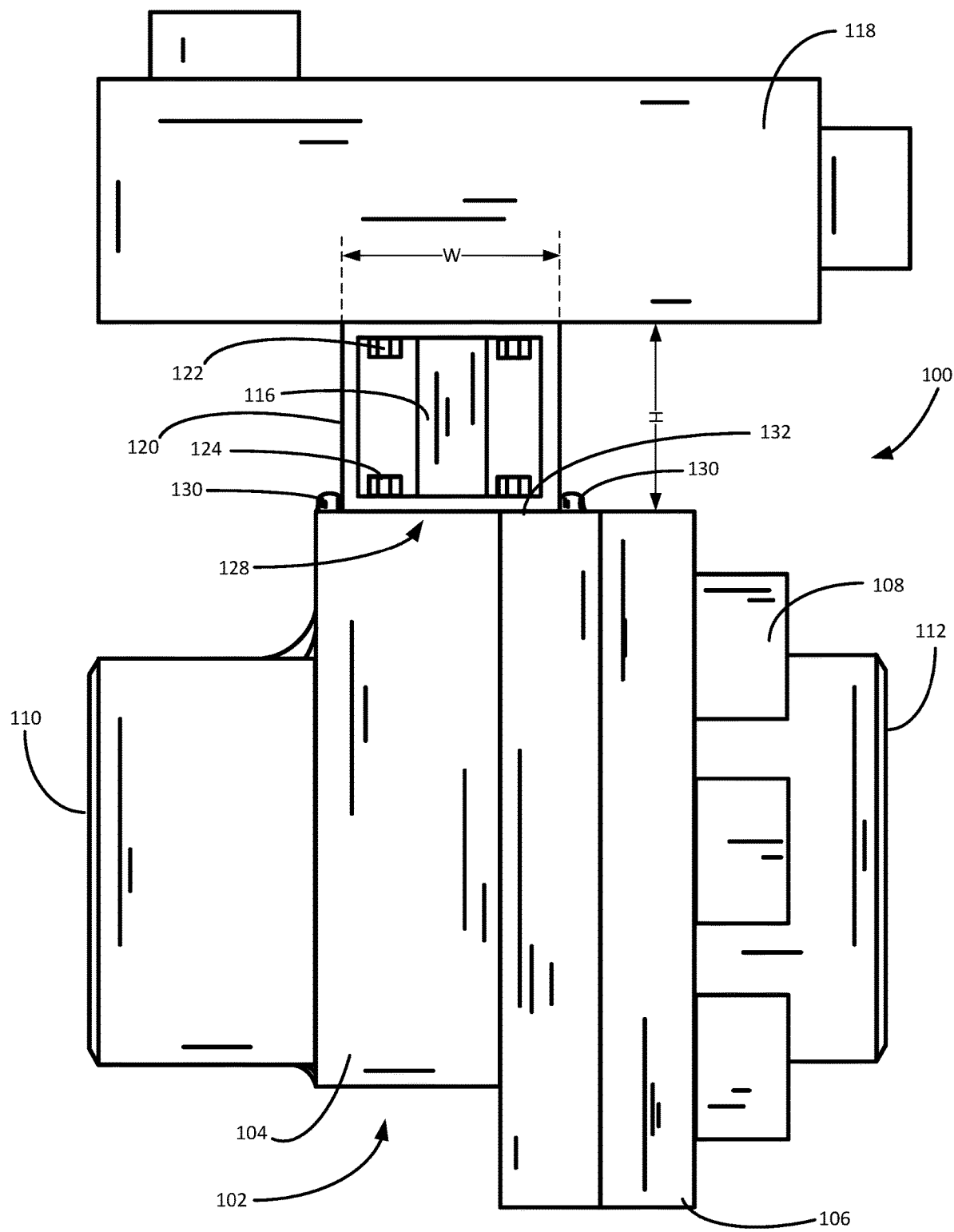
FIG. 2 is a side view of a motorized ball valve constructed in accordance with exemplary embodiments.
Figure 3:
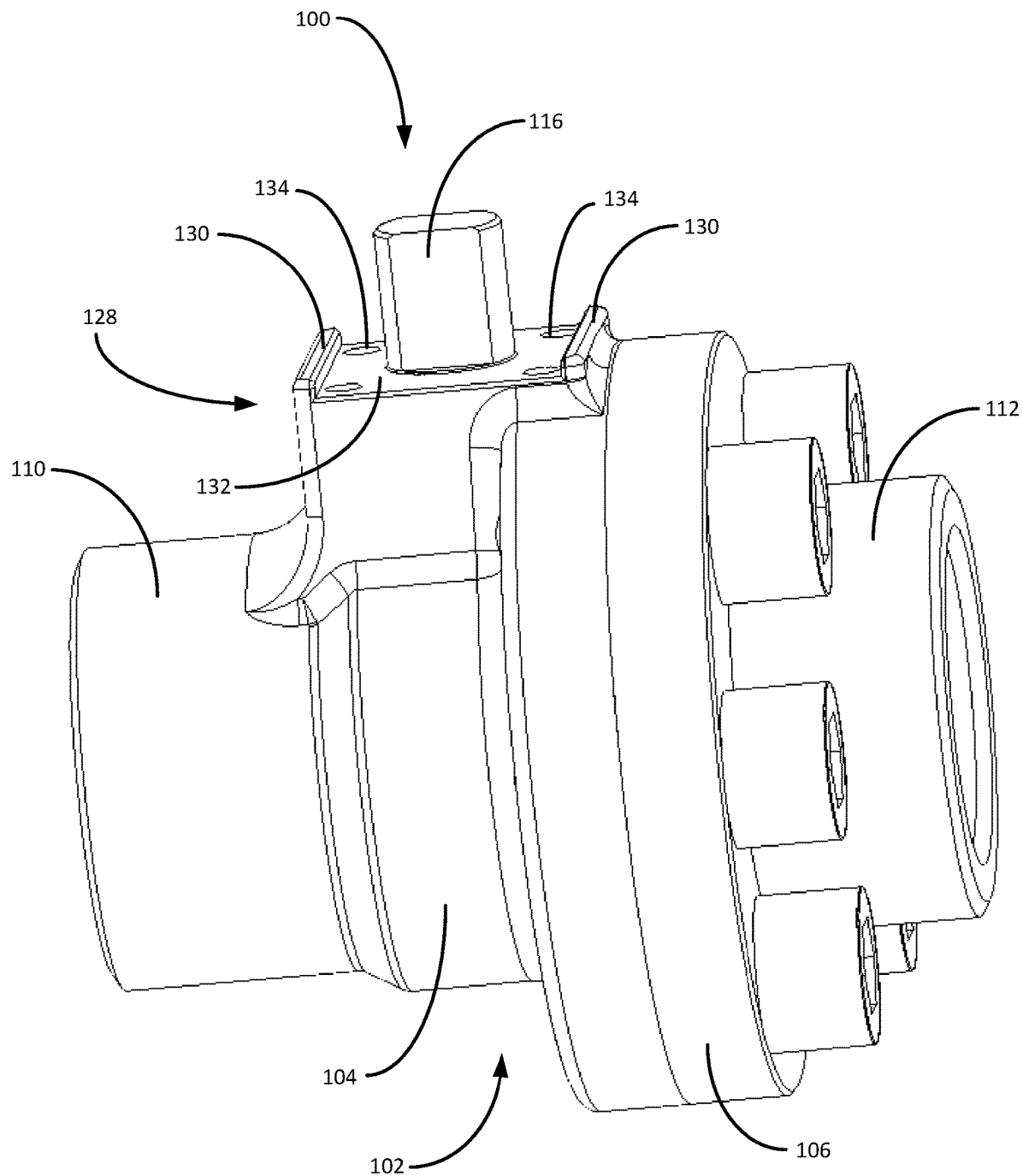
FIG. 3 is a perspective view of the motorized ball valve of FIG. 2 with the actuator and mounting bracket removed.
Figure 4:
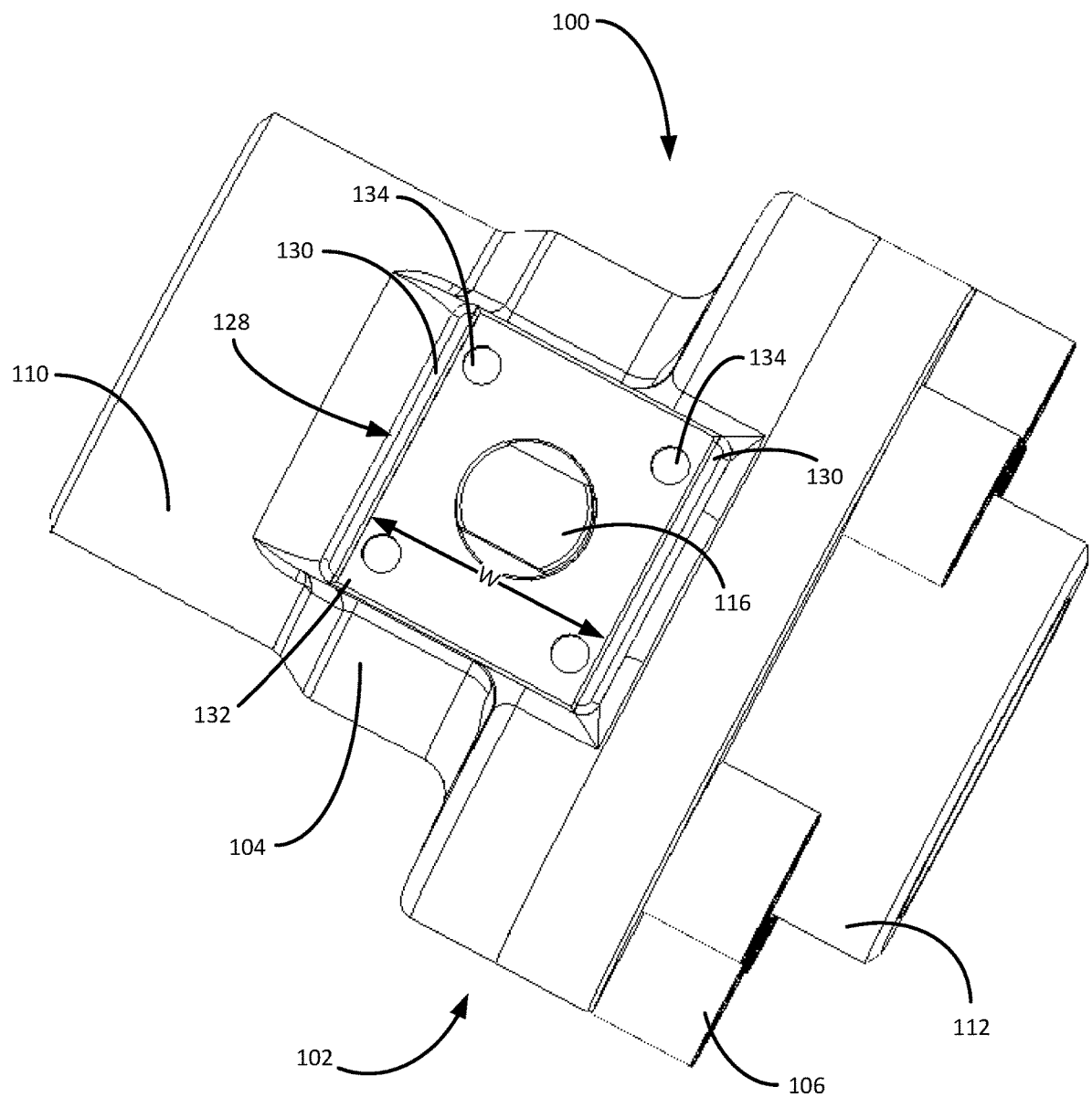
FIG. 4 is a top view of the motorized ball valve of FIG. 2 with the actuator and mounting bracket removed.

Referring to FIGS. 2-4, shown therein are side, perspective and top views, respectively, of a ball valve 100 constructed in accordance with exemplary embodiments of the present invention. The ball valve 100 includes a two-piece valve body 102 that has a first side 104 and a second side 106. The first side 104 and second side 106 can be held together with clamp fasteners 108. In some embodiments, the first side 104 and second side 106 are configured for a mating threaded engagement.

The first and second sides 104, 106 each include a fluid connection 110, 112. It will be appreciated that the ball valve 100 is configured for bidirectional fluid flow, such that fluid may enter the ball valve from either the first side 104 or the second side 106. Accordingly, as used in this disclosure, the relative positions of components within the ball valve 100 will be described in terms of "upstream" or "downstream" based on the direction of fluid flow through the ball valve 100.

The ball valve 100 also includes a valve ball 114 (not shown) positioned between the first and second sides 104, 106. A valve stem 116 extends from the valve ball 114 through the top of the first side 104 of the valve body 102. As is well understood in the art, rotation of the valve stem 114 changes the rotational position of the valve ball 114 to adjust the extent to which the ball valve 100 is open or closed. Although the valve stem 116 can be manually manipulated with a handle or wrench (not shown), in the embodiment depicted in FIG. 2, the ball valve 100 includes an actuator 118 that is connected to the valve stem 116. The actuator 118 includes an electric, pneumatic or hydraulic motor (not separately designated) that is configured to rotate the valve stem 116 in response to a control signal. The actuator 118 is not shown in FIGS. 3 and 4.

Figure 5:
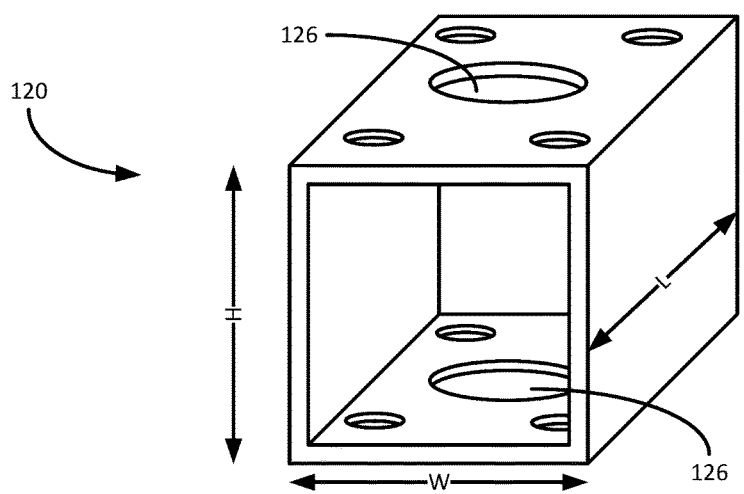
FIG. 5 is an isometric view of the mounting bracket from the motorized ball valve of FIG. 2.

The actuator 118 is attached to the valve body 102 with a mounting bracket 120, actuator bolts 122 and valve body bolts 124. An embodiment of the mounting bracket 120 is depicted in FIG. 5. In exemplary embodiments, the mounting bracket 120 is generally configured as an open-ended section of rectangular metal tubing that has a width (W), length (L) and height (H). The mounting bracket 120 has a central aperture 126 that permits the valve stem 116 to pass through the mounting bracket 120. Removable caps (not shown) can be placed over the open ends of the mounting bracket 120 to prevent water and dust from accumulating in the mounting bracket 120.

The valve body 102 includes an actuator bracket receiver 128 proximate the valve stem 116. The actuator bracket receiver 128 includes a pair of rails 130 and a base 132 through which the valve stem 116 extends. In preferred embodiments, the rails 130 are substantially parallel. In exemplary embodiments, the rails 130 are configured with a vertical inner wall to permit the mounting bracket 120 to be vertically lowered into the actuator bracket receiver 128. The rails 130 are spaced apart by the width (W) such that the mounting bracket 120 is tightly captured within the rails 130. In this way, the rails 130 prevent rotational movement of the mounting bracket 120 caused by the application of torque from the actuator 118. In some embodiments, the base 132 is constructed as an integral portion of the valve body 102.

The actuator bracket receiver 128 includes a plurality of fastener holes 134 extending through the base 132 into the valve body 102. Once the mounting bracket 120 is positioned over the valve stem 116, the valve body bolts 124 can be used to secure the mounting bracket 120 to the base 132 of the actuator bracket receiver 128. The actuator 118 can be attached to the upper side of the mounting bracket 120 with the actuator bolts 122. Although the mounting bracket 120 is depicted as a separable component, it will be appreciated that in certain applications the mounting bracket 120 may be integral with the actuator 118.

Figure 6A:
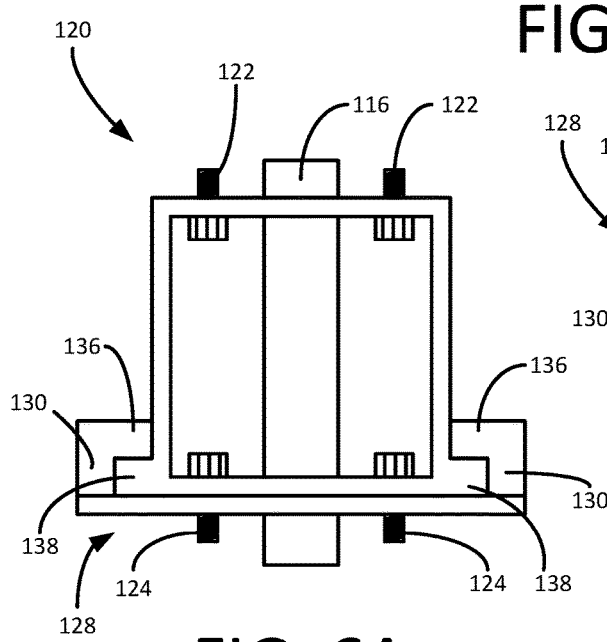
FIG. 6A is a side view of an embodiment of the mounting bracket from the motorized ball valve of FIG. 2.
Figure 6B:
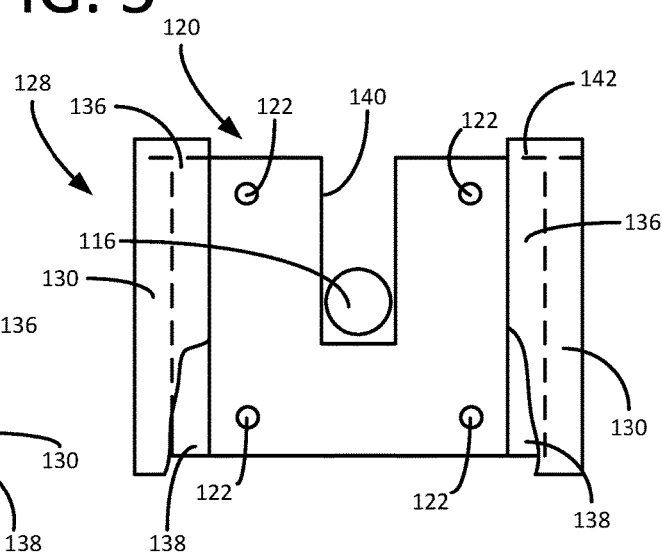
FIG. 6B is a top view of the mounting bracket of FIG. 6A.

In another embodiment depicted in FIGS. 6A and 6B, the rails 130 are configured with an overhung flange 136 and the mounting bracket includes base tabs 138 that fit tightly under the overhung flange 136 to prevent the mounting bracket 120 from being lifted out of the actuator bracket receiver 128 in the event the valve body bolts 124 are unintentionally loosened. In those embodiments, the mounting bracket 120 is configured as a collar that includes an open-sided valve stem recess 140 that permits the mounting bracket to be advanced horizontally into the actuator bracket receiver 128 until the valve stem 116 is captured within the valve stem recess. The overhung flanges 136 have been partially removed in FIG. 6B to reveal the base tabs 138. In some embodiments, the overhung flanges 136 optionally include a stop 142 that prevents the mounting bracket 120 from further advancing through the actuator bracket receiver 128. This use of the stop 142 assists in aligning and registering the mounting bracket 120 in position on the actuator bracket receiver 128 and valve body 102.

In each of the embodiments disclosed herein, the actuator bracket receiver 128 and mounting bracket 120 cooperate to securely connect the actuator 118 to the valve body 102. These embodiments present an advantage over prior art designs that rely solely on the valve body bolts 124 to secure the mounting bracket 120 and actuator 118 to the valve body 102. The design of the actuator bracket receiver 128 permits the use of standard mounting brackets 120 and actuators 118 with little or no modification. Additionally, the actuator bracket receiver 128 can be installed as a retrofit option on existing ball valves 100 to improve the performance and durability of the valve.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A motorized ball valve comprising:
   a valve body;
   an actuator bracket receiver connected to the valve body, wherein the actuator bracket receiver includes a pair of rails;
   a valve stem extending from the valve body through the actuator bracket receiver;
   an actuator operably connected to the valve stem;
   a mounting bracket connected between the actuator and the valve body, wherein the mounting bracket is captured between the pair of rails of the actuator bracket receiver and wherein the mounting bracket is removably secured to the valve body with a plurality of valve body bolts that extend through the actuator bracket receiver and mounting bracket into the valve body; and
   wherein the mounting bracket is secured to the actuator with a plurality of actuator bolts that extend through the mounting bracket into the actuator.

2. The motorized ball valve of claim 1, wherein the mounting bracket includes a central aperture through which the valve stem extends.

3. The motorized ball valve of claim 1, wherein each of the pair of rails includes an overhung flange.

4. The motorized ball valve of claim 3, wherein the mounting bracket includes base tabs on opposite sides of the mounting bracket and wherein the base tabs fit under the overhung flanges of the rails.

5. The motorized ball valve of claim 4, wherein the mounting bracket includes a valve stem recess that permits the mounting bracket to be advanced horizontally into registration with the valve stem.

6. A motorized ball valve comprising:
   a valve body, wherein the valve body includes an integrated actuator bracket receiver that includes a pair of rails;
   a valve stem extending from the valve body through the actuator bracket receiver;
   an actuator operably connected to the valve stem;
   a mounting bracket connected between the actuator and the valve body, wherein the mounting bracket is captured between the pair of rails of the integrated actuator bracket receiver and wherein the mounting bracket is secured to the valve body with a plurality of valve body bolts that extend through the mounting bracket into the valve body; and
   wherein the mounting bracket is secured to the actuator with a plurality of actuator bolts that extend through the mounting bracket into the actuator.

7. The motorized ball valve of claim 6, wherein the mounting bracket includes a central aperture through which the valve stem extends.

8. The motorized ball valve of claim 6, wherein each of the pair of rails includes an overhung flange.

9. The motorized ball valve of claim 8, wherein the mounting bracket includes base tabs on opposite sides of the mounting bracket and wherein the base tabs fit under the overhung flanges of the rails.

10. The motorized ball valve of claim 9, wherein the mounting bracket includes a valve stem recess that permits the mounting bracket to be advanced horizontally into registration with the valve stem.

11. A motorized ball valve comprising:
   a valve body;
   a valve stem extending from the valve body;
   an actuator operably connected to the valve stem;
   a mounting bracket connected to the actuator with actuator bolts and to the valve body with valve body bolts that extend through the mounting bracket into the valve body; and
   means for preventing movement of the mounting bracket relative to the valve body.

12. The motorized ball valve of claim 11, wherein the mounting bracket includes a central aperture through which the valve stem extends.

\* \* \* \* \*